(12) United States Patent
Cerny (10) Patent No.: US 12,168,372 B2
(45) Date of Patent: Dec. 17, 2024

(54) VARIABLE OSCILLATION THREE DIMENSIONAL SIPE

(71) Applicant: Bridgestone Bandag, LLC, Muscatine, IA (US)

(72) Inventor: Andrew D. Cerny, Riverside, IA (US)

(73) Assignee: Bridgestone Bandag, LLC, Nashville, TN (US)

( * ) Notice: Subject to any disclaimer, the term of this patent is extended or adjusted under 35 U.S.C. 154(b) by 552 days.

(21) Appl. No.: 16/493,320

(22) PCT Filed: Mar. 21, 2018

(86) PCT No.: PCT/US2018/023500
§ 371 (c)(1),
(2) Date: Sep. 12, 2019

(87) PCT Pub. No.: WO2018/183053
PCT Pub. Date: Oct. 4, 2018

(65) Prior Publication Data
US 2020/0070588 A1 Mar. 5, 2020

Related U.S. Application Data

(60) Provisional application No. 62/477,109, filed on Mar. 27, 2017.

(51) Int. Cl.
*B60C 11/12* (2006.01)
*B60C 11/03* (2006.01)
(Continued)

(52) U.S. Cl.
CPC .......... *B60C 11/1218* (2013.01); *B60C 11/04* (2013.01); *B60C 11/1259* (2013.01);
(Continued)

(58) Field of Classification Search
CPC . B60C 11/1218; B60C 11/12; B60C 11/1204; B60C 11/1227
See application file for complete search history.

(56) References Cited

U.S. PATENT DOCUMENTS 2,983,005 A 5/1961 Spier
4,794,965 A * 1/1989 Lagnier ............... B60C 11/1218
152/209.1

(Continued)

FOREIGN PATENT DOCUMENTS

CN 102239059 A 11/2011
DE 102005058365 A1 6/2007
(Continued)

OTHER PUBLICATIONS

JP 2000-177329 Machine Translation; Shigetaka, Ikeki (Year: 2000).*
(Continued)

*Primary Examiner* — Robert C Dye
*Assistant Examiner* — Nicholas J Weiler (57) ABSTRACT

A tire can include a three-dimensional sipe formed into a tire tread. The three-dimensional sipe can be formed in a tread element of the tire tread and can include a three-dimensional pattern. The three-dimensional sipe can have a first frequency of oscillation at a top end of the three-dimensional sipe and a second frequency of oscillation at a bottom end of the three-dimensional sipe with the first frequency of oscillation being different from the second frequency of oscillation.

18 Claims, 8 Drawing Sheets

(51) Int. Cl.
*B60C 11/04* (2006.01)
*B60C 11/13* (2006.01)

(52) U.S. Cl.
CPC ............... *B60C 2011/0346* (2013.01); *B60C 2011/0381* (2013.01); *B60C 2011/1213* (2013.01); *B60C 11/1369* (2013.01)

(56) References Cited

U.S. PATENT DOCUMENTS

| | | | |
|---|---|---|---|
| 4,878,526 A * | 11/1989 | Ochiai | B60C 11/12 |
| | | | 152/DIG. 3 |
| 5,783,002 A | 7/1998 | Lagnier | |
| 6,116,310 A * | 9/2000 | Shinohara | B60C 11/13 |
| | | | 152/902 |
| 7,143,799 B2 | 12/2006 | Collette et al. | |
| 7,360,568 B2 | 4/2008 | Stuhldreher | |
| 7,516,767 B2 | 4/2009 | Tsubono et al. | |
| 8,127,811 B2 | 3/2012 | Ohara | |
| 8,790,101 B2 | 7/2014 | Dusseaux | |
| 2001/0048182 A1 | 12/2001 | Caretta et al. | |
| 2003/0029537 A1* | 2/2003 | Iwamura | B60C 11/1218 |
| | | | 152/209.18 |
| 2005/0150581 A1* | 7/2005 | Kishida | B60C 11/12 |
| | | | 152/209.18 |
| 2006/0027295 A1 | 2/2006 | Knispel et al. | |
| 2013/0133799 A1 | 5/2013 | Furusawa et al. | |
| 2013/0153106 A1* | 6/2013 | Clemmer | B60C 11/1218 |
| | | | 152/209.23 |
| 2015/0251499 A1 | 9/2015 | Jin et al. | |
| 2017/0210176 A1* | 7/2017 | Ninomiya | B60C 11/04 |
| 2018/0001712 A1* | 1/2018 | Fujioka | B60C 11/1353 |

FOREIGN PATENT DOCUMENTS

| | | | | |
|---|---|---|---|---|
| EP | 0 933 235 | | 8/1999 | |
| EP | 1 555 142 | | 7/2005 | |
| EP | 2889160 A2 | | 7/2015 | |
| EP | 2 913 205 | | 9/2015 | |
| JP | S63-235107 | | 9/1988 | |
| JP | H04-35005 U | | 3/1992 | |
| JP | H04-197809 | | 7/1992 | |
| JP | H04-306106 | | 10/1992 | |
| JP | H06-143941 | | 5/1994 | |
| JP | 2000-177329 | | 6/2000 | |
| JP | 2000177329 A * | | 6/2000 | B60C 11/1218 |
| JP | 2003-118322 | | 4/2003 | |
| JP | 3682918 | | 4/2003 | |
| JP | 2005-126055 | | 5/2005 | |
| JP | 2005126055 A * | | 5/2005 | B60C 11/12 |
| JP | 2006-096324 | | 4/2006 | |
| JP | 2007-015510 | | 1/2007 | |
| JP | 2010-023586 | | 2/2010 | |
| JP | 2015-500179 | | 1/2015 | |
| KR | 1020100055111 | | 5/2010 | |
| WO | 2007145603 A1 | | 12/2007 | |
| WO | 2013064300 A1 | | 5/2013 | |

OTHER PUBLICATIONS

JP 2005-126055 Machine Translation; Yoshimasa, Hashimoto (Year: 2005).*
Extended European Search Report for EP Application No. 18776170.5, dated Sep. 25, 2020.
Office Action from CN Application No. 201880021047.2, dated Sep. 7, 2021.
Office Action for CN Application No. 201880021047.2, dated Dec. 14, 2020.
Machine translation of WO2013064300A1 published on May 10, 2013 owned by Matthias Seng.
Lee, Jong Kyung, International Search Report and Written Opinion, International Searching Authority, Jul. 5, 2018, pp. 1-16, Korean Intellectual Property Office, Daejeon, Republic of Korea.
Machine Translation DE102005058365A1 published on Jun. 14, 2007 owned by Continental Reifen Deutschland GmbH.
Office Action for JP Application No. 2021-119213, dated Aug. 30, 2022, English Translation.

* cited by examiner

VARIABLE OSCILLATION THREE DIMENSIONAL SIPE

FIELD

This application generally to apparatuses and methods of forming a three-dimensional sipe in a tire.

BACKGROUND

Sipes are sometimes cut or molded into tread to improve traction. Sipes may be formed in ribs and blocks of a tread and may exhibit the effect of cutting through water films on road surfaces, similar to edges of grooves. Sipes may also facilitate deformation of ribs and blocks, and may inhibit tire hysteresis loss. A sipe pattern can be within one or more blocks, ribs or lugs of the tire tread and included within the boundary of each tread element. Some sipes may be cut straight across the tire tread, or at a constant bias angle within tread elements.

SUMMARY

The present disclosure generally describes three-dimensional sipes and methods of forming the three-dimensional sipes into a tire tread. Sipes are sometimes cut or molded into tread to improve traction and resistance to wear. When implementing a three-dimensional sipe, the sipe oscillation in a radial direction of the tire has been constant. This can result in a compromise between an aggressive radial oscillation that makes the tread rubber difficult to extract from a mold or a less aggressive oscillation that results in reduced stability between two adjacent blocks of rubber when loaded in the tire footprint in service. By varying the intensity of the radial oscillation of the sipe blade, an improved three-dimensional sipe can result in improved stability provided between the tread blocks with a higher frequency oscillation to the sipe at an outer radial location of the tire tread and improved flexibility to facilitate removal of the tire tread from a mold with a lower frequency oscillation to the sipe at an inner radial location of the tire tread.

Some implementations include a tire that may include a tire tread with a rotational axis, a plurality of tread elements positioned on a tire tread surface so as to comprise a tread pattern, a plurality of grooves provided between the plurality of tread elements, and a sipe formed in at least one of the plurality of tread elements. The plurality of tread elements may be positioned at least one of axially or circumferentially on the tire tread surface. The sipe may include a three-dimensional pattern having a first frequency of oscillation at a top end of the sipe and a second frequency of oscillation at a bottom end of the sipe. The first frequency of oscillation may be different from the second frequency of oscillation.

In some implementations, the first frequency of oscillation may be greater than the second frequency of oscillation. In some implementations, the three-dimensional pattern may be one of a saw-tooth, sinusoidal, square, or triangular pattern. In some implementations, the three-dimensional pattern may have a first amplitude at the top end of the sipe and a second amplitude at the bottom end of the sipe with the first amplitude being different from the second amplitude. In some implementations, the first amplitude may be greater than the second amplitude. In some implementations, the sipe may have a sipe depth in a range of 60% to 100% of a height of the plurality of tread elements. In some implementations, the sipe may have a sipe depth greater than 100% of a height of the plurality of tread elements. In some implementations, the tire may be a pneumatic tire.

Some implementations include a tread pattern for a tire tread. The tread pattern can include a plurality of tread elements positioned on a tire tread surface so as to comprise a tread pattern, a plurality of grooves provided between the plurality of tread elements, and a sipe formed in at least one of the plurality of tread elements. The plurality of tread elements may be positioned at least one of axially or circumferentially on the tire tread surface. The sipe may include a three-dimensional pattern having a first frequency of oscillation at a top end of the sipe and a second frequency of oscillation at a bottom end of the sipe. The first frequency of oscillation may be different from the second frequency of oscillation.

In some implementations, the first frequency of oscillation may be greater than the second frequency of oscillation. In some implementations, the three-dimensional pattern may be one of a saw-tooth, sinusoidal, square, or triangular pattern. In some implementations, the three-dimensional pattern may have a first amplitude at the top end of the sipe and a second amplitude at the bottom end of the sipe with the first amplitude being different from the second amplitude. In some implementations, the first amplitude may be greater than the second amplitude. In some implementations, the sipe may have a sipe depth in a range of 60% to 100% of a height of the plurality of tread elements. In some implementations, the sipe may have a sipe depth greater than 100% of a height of the plurality of tread elements.

Some implementations include a method of forming a tire tread with a varying frequency of oscillation for a three-dimensional sipe. The method may include providing a tire tread mold, forming a tire tread using the mold, and extracting the tire tread from the mold. The tire tread mold may have one or more three-dimensional sipe blades with each of the one or more three-dimensional sipe blades having a three-dimensional pattern with a first frequency of oscillation at a top end of the one or more three-dimensional sipe blades and a second frequency of oscillation at a bottom end of the one or more three-dimensional sipe blades. The first frequency of oscillation may be different from the second frequency of oscillation. The tire tread formed using the mold may include a sipe formed in at least one tread element. The sipe may include the three-dimensional pattern having the first frequency of oscillation at a top end of the sipe and the second frequency of oscillation at a bottom end of the sipe.

In some implementations, the first frequency of oscillation may be greater than the second frequency of oscillation. In some implementations, the three-dimensional pattern may be one of a saw-tooth, sinusoidal, square, or triangular pattern. In some implementations, the three-dimensional pattern may have a first amplitude at the top end of the sipe and a second amplitude at the bottom end of the sipe with the first amplitude being different from the second amplitude. In some implementations, the first amplitude may be greater than the second amplitude.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

In the description that follows, structures and features that are the same or similar as shown in the various views of the drawings are denoted by the same reference numerals throughout the several views for consistency and simplicity, but it should be appreciated that the various structures or features may differ that those shown.

For ease of understanding this disclosure the following terms are disclosed:

"Aspect ratio" of the tire may refer to the ratio of its section height (SH) to its section width (Sw) multiplied by 100% for expression as a percentage.

"Asymmetric tread" may refer to a tread that has a tread pattern not symmetrical about the centerplane or an equatorial plane (EP) of the tire.

"Axial" and "axially" may refer to lines or directions that are parallel to an axis of rotation of the tire.

"Circumferential" may refer to lines or directions extending along the perimeter of the surface of the annular tire tread perpendicular to an axial direction.

"Groove" may refer to an elongated void area in a tire tread that may extend circumferentially or laterally about the tire tread in a straight, curved, zigzag or any other suitable manner. Circumferentially and laterally extending grooves may sometimes have common portions. The "groove width" may be equal to a tread surface area occupied by a groove or groove portion, thus, the groove width may be its average width over its length. Grooves may be of varying depths in a tire. The depth of a groove may vary around the circumference of the tread, or the depth of one groove may be constant but vary from the depth of another groove in the tire. In some embodiments, the depth of the groove may be constant along the tire. If such narrow or wide grooves are of substantially reduced depth as compared to wide circumferential grooves which they interconnect, they may be regarded as forming "tie bars" tending to maintain a rib-like character in the tread region involved.

"Net-to-gross ratio" may refer to the total area of ground contacting tread elements between the lateral edges around the entire circumference of the tread divided by the gross area of the entire tread between the lateral edges.

"Non-directional tread" may refer to a tread that has no preferred direction of forward travel and is not required to be positioned on a vehicle in a specific wheel position or positions to ensure that the tread pattern is aligned with the preferred direction of travel. Conversely, a directional tread pattern may have a preferred direction of travel requiring specific wheel positioning.

"Radial" and "radially" may refer to directions radially toward or away from the axis of rotation of the tire.

"Rib" may refer to a circumferentially extending strip of rubber on the tread with at least one circumferential groove and either a second such groove or a lateral edge, the strip being laterally undivided by full-depth grooves.

"Sipe" may refer to small slots molded or cut into the tread elements of the tire that subdivide the tread surface and may improve traction.

"Tread element" or "traction element" may refer to a rib, lug or a block element.

"Lugs" may refer to the section of the tread element that make contact with a surface.

"Voids" may refer to spaces that are located between the lugs.

Sipes are sometimes cut or molded into tread to improve traction and resistance to wear. When implementing a three-dimensional sipe, the sipe oscillation in a radial direction of the tire has been constant. This can result in a compromise between an aggressive radial oscillation that makes the tread rubber difficult to extract from a mold or a less aggressive oscillation that results in reduced stability between two adjacent tread blocks of rubber when loaded in the tire footprint in service. By varying the intensity of the radial oscillation of the sipe blade, an improved three-dimensional sipe can result in improved stability provided between the tread blocks with a higher frequency oscillation to the sipe at an outer radial location of the tire tread and improved flexibility to facilitate removal of the tire tread from a mold with a lower frequency oscillation to the sipe at an inner radial location of the tire tread.

The frequency oscillation can be higher near the mold floor, which can result in a tire tread performing better when the tread is tall and near new when the tread blocks are most flexible away from the floor of the tread and need the most support. The oscillation frequency decreases from the mold floor to the top of the mold. This decreasing frequency of oscillation can reduce the amount of lock-up between adjacent tread blocks as the tread wears away. However, the tread blocks become stiffer as the tread wears away toward the tread floor by virtue of the tread blocks being shorter as the tread wears and, therefore, may be less reliant on the adjacent tread blocks for support. This variable frequency oscillation can allow manufacturing of a tread that may otherwise be unfeasible by uniform intensity siping.

Figure 1:
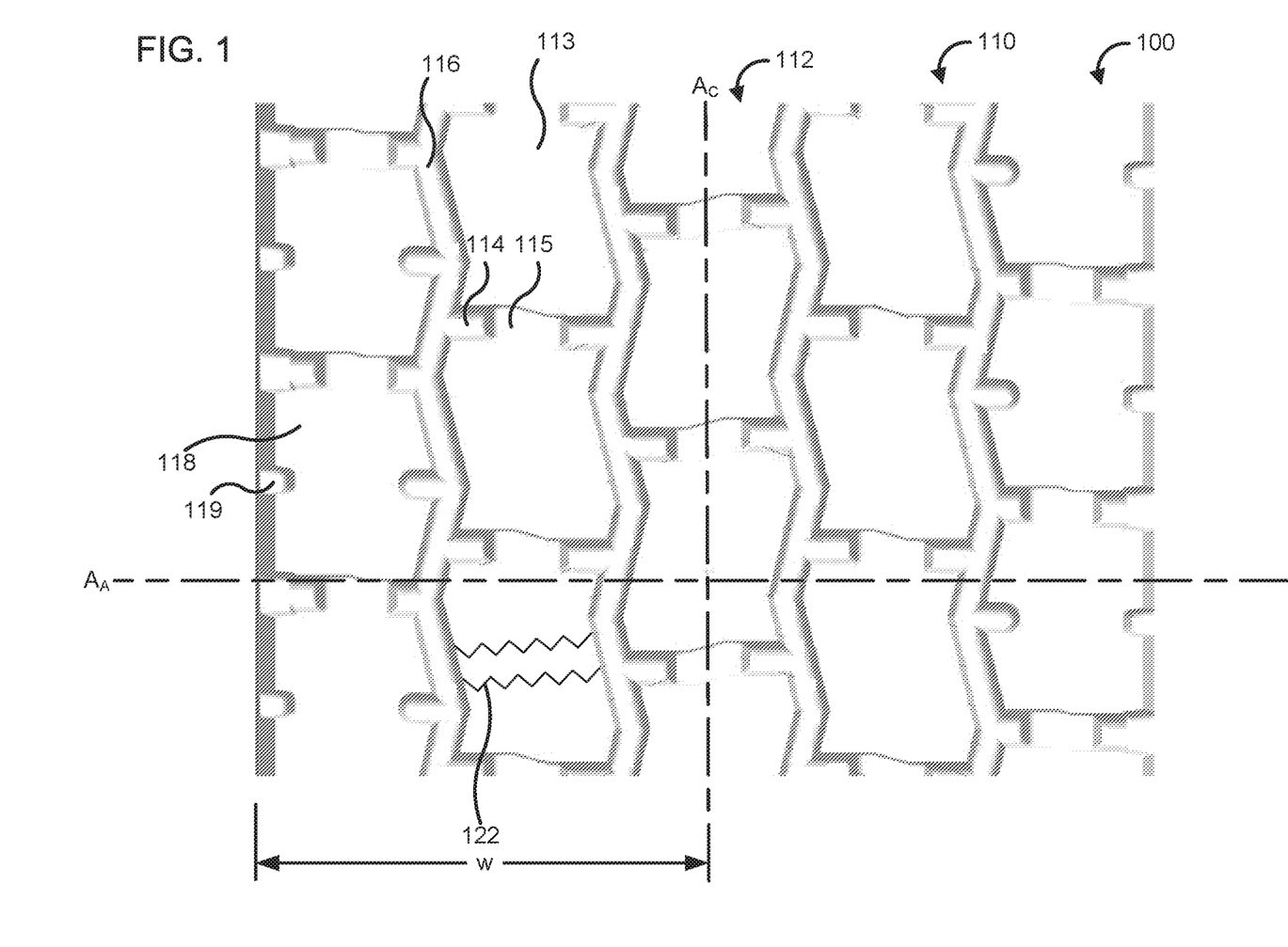
FIG. 1 is a front view of a portion of a tire tread.

FIG. 1 is a front view of a portion of a tire tread 100 of a tire, according to some embodiments. The tire may include a pneumatic tire. The tire tread 100 may include a rotational axis AA and a tread pattern 110. Specifically, the tire tread 100 may include a plurality of tread elements 112 positioned on a surface of the tire tread 100 that provide the tread pattern 110. The tire tread 100 may be molded with the tire, or molded separately and thereafter coupled to an outer surface of the tire (e.g., via an adhesive, curing, fusion bonding, heat bonding, etc.).

Figure 2:
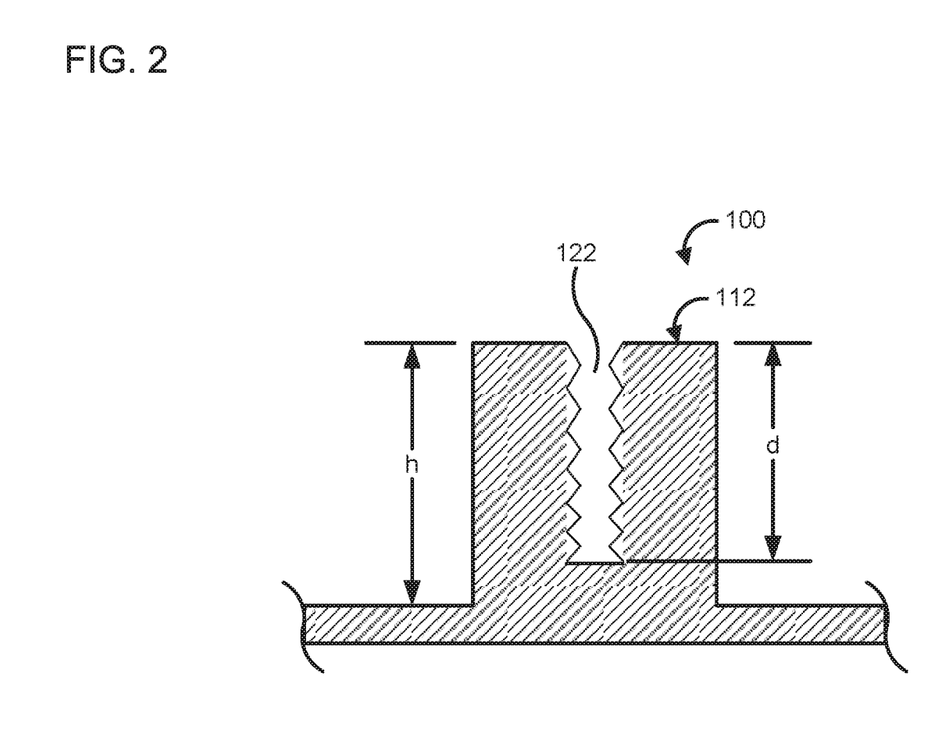
FIG. 2 is a side cross-section view of a tread element of the tire tread of FIG. 1.

The plurality of tread elements 112 may include a plurality of circumferential lugs 113 separated by voids 114. A connecting block 115 may be positioned in the void 114 between each of the lugs 113, and coupled to each of the adjacent lugs 113. FIG. 2 is a side cross-section view of a portion of the tire tread 100 including single tread element 112. As seen in FIG. 2, each tread element has a height "h". A height of each of the connecting block 115 may be smaller than the height h of the tread elements 112 such that the connecting blocks 115 do not contact the surface on which the tire tread 100 is positioned. Furthermore, the tire tread 100 may have a half width "w" (FIG. 1) measured from a circumferential axis $A_C$ of the tire tread 100 to an axial end thereof.

A plurality of circumferential grooves 116 may be provided between each of the plurality of tread elements 112. The tread elements 112 may also include shoulder blocks 118 positioned at axial ends of the tire tread 100. A plurality of notches 119 or slots may be provided in the shoulder blocks 118.

It is to be appreciated that while the tire tread 100 is shown as having a particular tread pattern 110, the tire tread 100 may have any suitable tread pattern. For example, the plurality of tread elements 112 may be axially or circumferentially positioned on a surface of the tire tread 100, include straight, curved or zig zag grooves, a pitch pattern, a non-directional tread pattern, a symmetric tread or an asymmetric tread. Furthermore, the tire tread 100 may have any suitable aspect ratio or net-to-gross ratio.

The tire tread 100 may include one or more sipes 122 can be formed in one or more of the tread elements 112. For instance, the one or more sipes 122 may be formed in the lug 113, the connecting block 115, and/or the void 114. The one or more sipes 122 may be molded into the tire tread 100, for example during a molding operation of the tire tread 100, or cut into the tread elements 112 after molding of the tire tread 100. Moreover, the one or more sipes 122 may be inclined towards a direction of rotation of the tire tread 100, perpendicular to a direction of rotation of the tire tread 100, or at any angle from 0 degrees to 90 degrees relative to the direction of rotation of the tire tread 100. In some implementations, the one or more sipes 122 may be set at an angle relative to the circumferential axis $A_C$ of the tire tread 100.

Each sipe 122 included in the one or more sipes 122 may be positioned parallel to an adjacent sipe 122 at any suitable pitch or distance therefrom. In some embodiments, the distance may be in a range of 5 mm to 40 mm inclusive of all ranges and values therebetween. Furthermore, the distance or pitch may be fixed or variable.

Furthermore, each of the one or more sipes 122 may have a sipe depth d greater than 50% of the height h of each of the plurality of tread elements 112, measured from a top surface of the tread element 112 positioned opposite the surface of the tire tread 100 on which the tread elements 112 are positioned. For example, each of the one or more sipes 122 may have a sipe depth d in a range of 60% to 100% of the height h of the plurality of tread elements 112 inclusive of all ranges and values therebetween. In some embodiments, each of the one or more sipes 122 may have a sipe depth greater than 100% of the height of the plurality of tread elements (e.g., about 101% to 110% of the height h of the plurality of tread elements 112 inclusive of all ranges and values therebetween).

Figure 3:
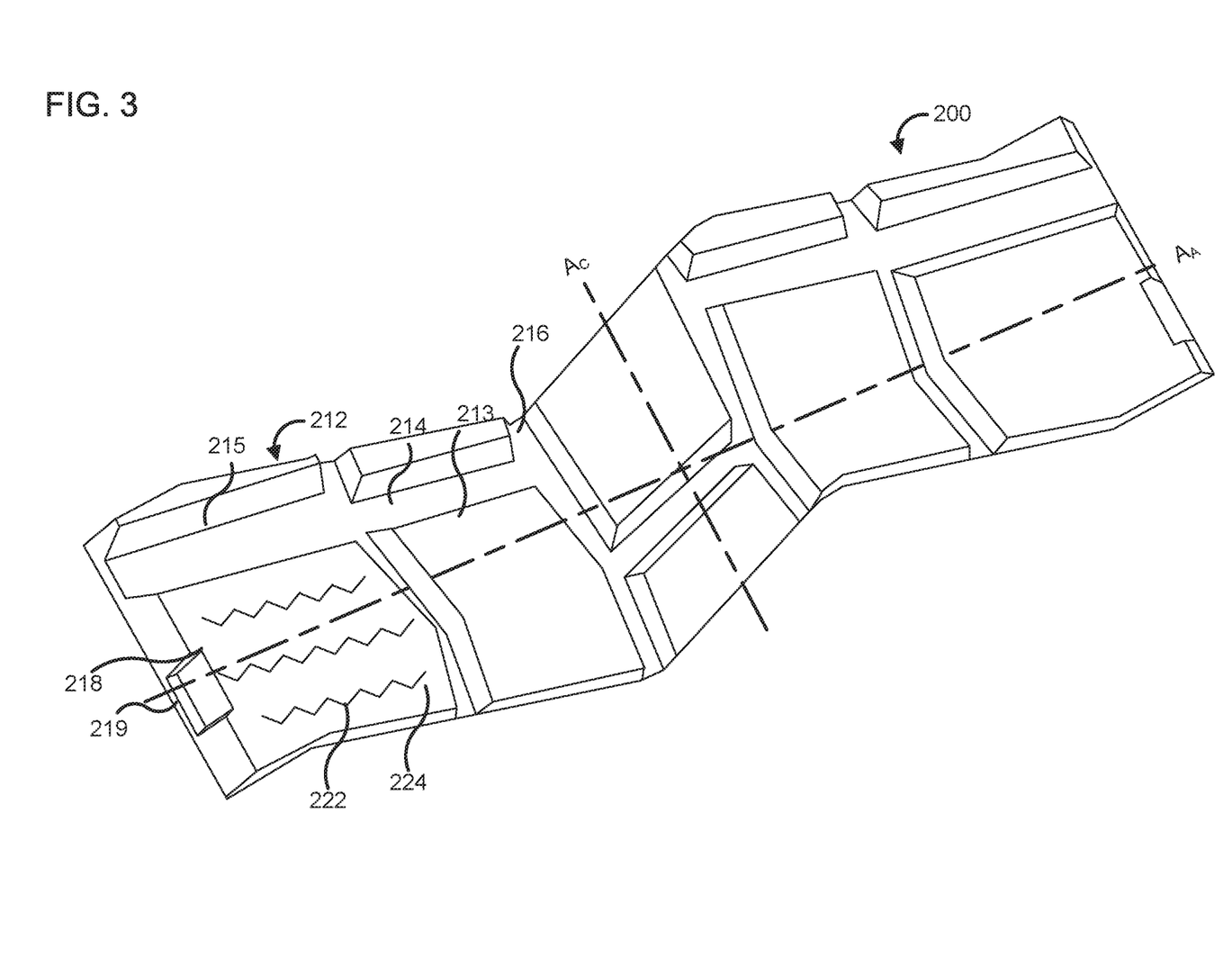
FIG. 3 is a perspective view of a portion of a tire tread having a variable intensity three-dimensional sipe formed therein.
Figure 4:
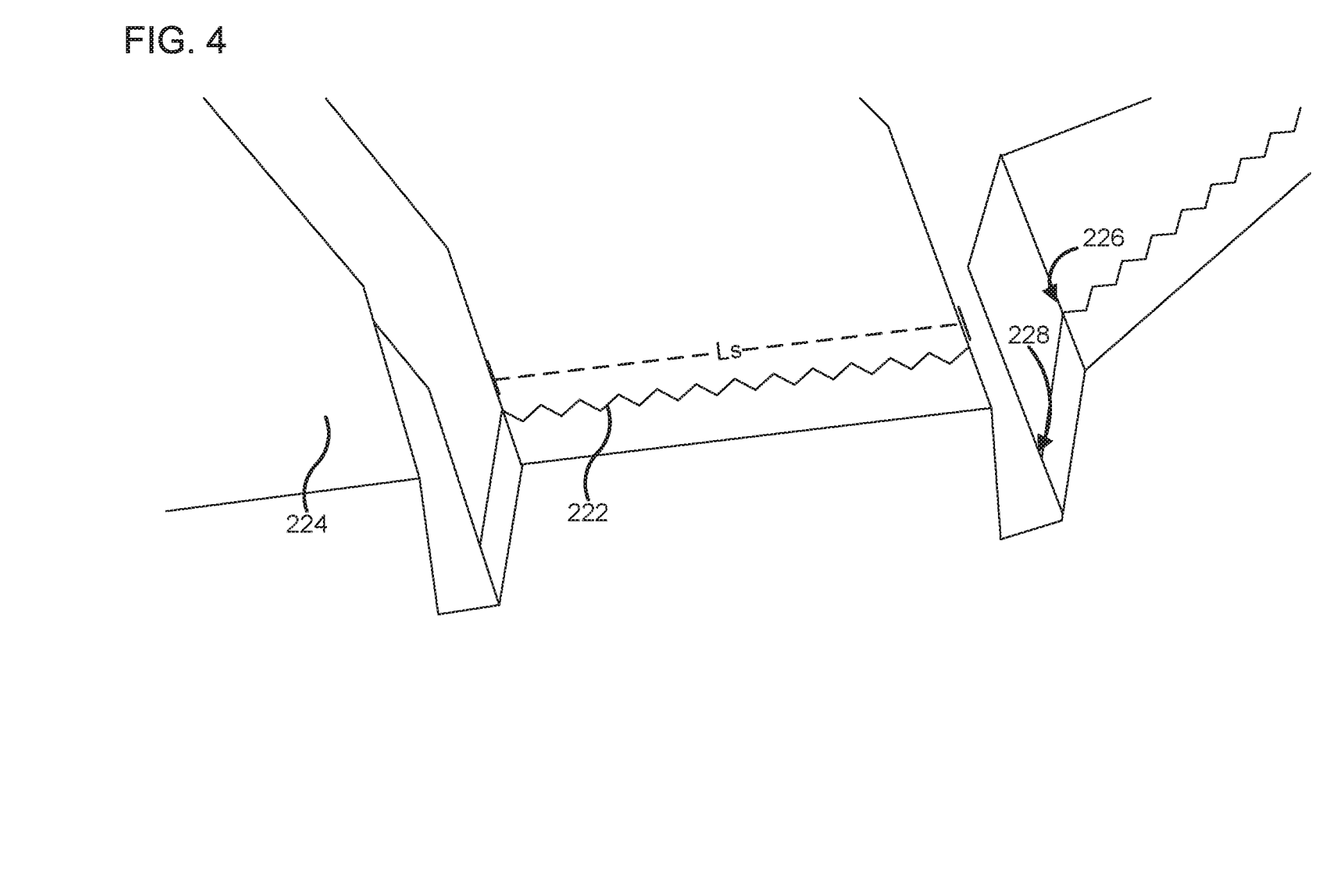
FIG. 4 is a close-up perspective view of a portion of the tire tread of FIG. 3 having a variable intensity three-dimensional sipe formed therein.

FIGS. 3-4 depict an implementation of a tire tread 200 with a plurality of three-dimensional sipes 222 formed in the tire tread 200. The tire tread 200 can be formed in a similar manner to the tire tread 100 of FIG. 1 and includes a plurality of tread elements 212 that may include a plurality of circumferential lugs 213 separated by voids 214 with a connecting block 215 positioned in the void 214 between each of the lugs 213, a plurality of circumferential grooves 216 provided between each of the plurality of tread elements 212, and shoulder blocks 218 positioned at axial ends of the tire tread 210 with a plurality of notches 219 or slots provided in the shoulder blocks 218.

In the implementation shown, the tire tread 200 may include one or more three-dimensional sipes 222 can be formed in one or more of the tread elements 212 and/or the plurality of grooves 216. For instance, the one or more three-dimensional sipes 222 may be formed in the lug 213, the connecting block 215, and/or the void 214. The one or more three-dimensional sipes 222 may be molded into the tire tread 200, for example during a molding operation of the tire tread 200, or cut into the tread elements 212 after molding of the tire tread 200. Moreover, the one or more three-dimensional sipes 222 may be inclined towards a direction of rotation of the tire tread 200, perpendicular to a direction of rotation of the tire tread 200, or at any angle from 0 degrees to 90 degrees relative to the direction of rotation of the tire tread 200. In some implementations, the one or more three-dimensional sipes 122 may be set at an angle relative to the circumferential axis $A_C$ of the tire tread 200.

Each three-dimensional sipe 222 included in the one or more three-dimensional sipes 222 may be positioned parallel to an adjacent three-dimensional sipe 222 at any suitable pitch or distance therefrom. In some embodiments, the distance may be in a range of 5 mm to 40 mm inclusive of all ranges and values therebetween. Furthermore, the distance or pitch may be fixed or variable.

Furthermore, each of the one or more three-dimensional sipes 222 may have a three-dimensional sipe depth d greater than 50% of the height h of each of the plurality of tread elements 212, measured from a top surface of the tread element 212 positioned opposite the surface of the tire tread 200 on which the tread elements 212 are positioned. For example, each of the one or more three-dimensional sipes 222 may have a three-dimensional sipe depth d in a range of 60% to 100% of the height h of the plurality of tread elements 212 inclusive of all ranges and values therebetween. In some embodiments, each of the one or more three-dimensional sipes 222 may have a three-dimensional sipe depth greater than 100% of the height of the plurality of tread elements (e.g., about 101% to 110% of the height h of the plurality of tread elements 212 inclusive of all ranges and values therebetween).

In the implementation shown, the one or more three-dimensional sipes 222 can extend along the rotational axis AA into an adjacent groove 216 of the plurality of grooves 216. In some implementations, a terminal end 224 can be provided at one or more ends of each three-dimensional sipe 222. The terminal end 224 may include an opening to permit removal of a sipe blade of a mold, as will be described in greater detail in reference to FIGS. 5-7. The three-dimensional sipes 222 shown include a zig-zag pattern along a length Ls of the three-dimensional sipe 222, as will be discussed in greater detail in reference to FIGS. 5-7, the sipe 222 includes alternating saw-toothed type patterns to provide a three-dimensional shape to the sipe 222 in both the axial length Ls of the sipe 222 and perpendicular to or at any other angle relative to the axial length Ls of the sipe 222. In other implementations, a sinusoidal pattern, a square pattern, a triangular pattern, or any other pattern may be implemented for the three-dimensional sipe 222.

The pattern of the three-dimensional sipe 222 oscillates with a decreasing frequency from a top end 226 of the three-dimensional sipe 222 to a bottom end 228 of the three-dimensional sipe 222 along the height h of the three-dimensional sipe 222. That is, a high frequency of oscillation of the three-dimensional pattern is present at the top end 226 and a lower frequency of oscillation of the three-dimensional pattern is present at the bottom end 228. The high oscillation may perform better when the tire tread 200 and the tread element 212 into which the three-dimensional sipe 222 is formed into is tall and near new, while still permitting the three-dimensional sipe mold to be removed from within the molded three-dimensional sipe 222 after curing as the tread element 212 may be more flexible. The high oscillation provides additional support to the tread element 212 even though the tread element 212 is more flexible. The frequency of oscillation decreases as the height of the three-dimensional sipe 222 decreases to the bottom end 228. This decreases the amount of lock-up between adjacent tread element portions as the tread wears away. However, each tread element portion becomes stiffer by virtue of the decreasing height as the tire tread 200, and therefore is less reliant on the adjacent tread element portions for support.

In some implementations, an amplitude of the three-dimensional sipe 222 may vary along the height h of the three-dimensional sipe 222 and/or along the axial length Ls of the three-dimensional sipe 222. That is, the three-dimensional pattern can have a first amplitude at the top end 226 of the three-dimensional sipe 222 and a second amplitude at the bottom end 228 of the three-dimensional sipe 222, the first amplitude different from the second amplitude. The first amplitude can be greater than the second amplitude. In still other implementations, the amplitude of the three-dimensional sipe 222 may vary at different positions of the three-dimensional sipe 222, such as higher amplitudes of the oscillation at the terminal end 224 and/or at the top end 226.

Figure 5:
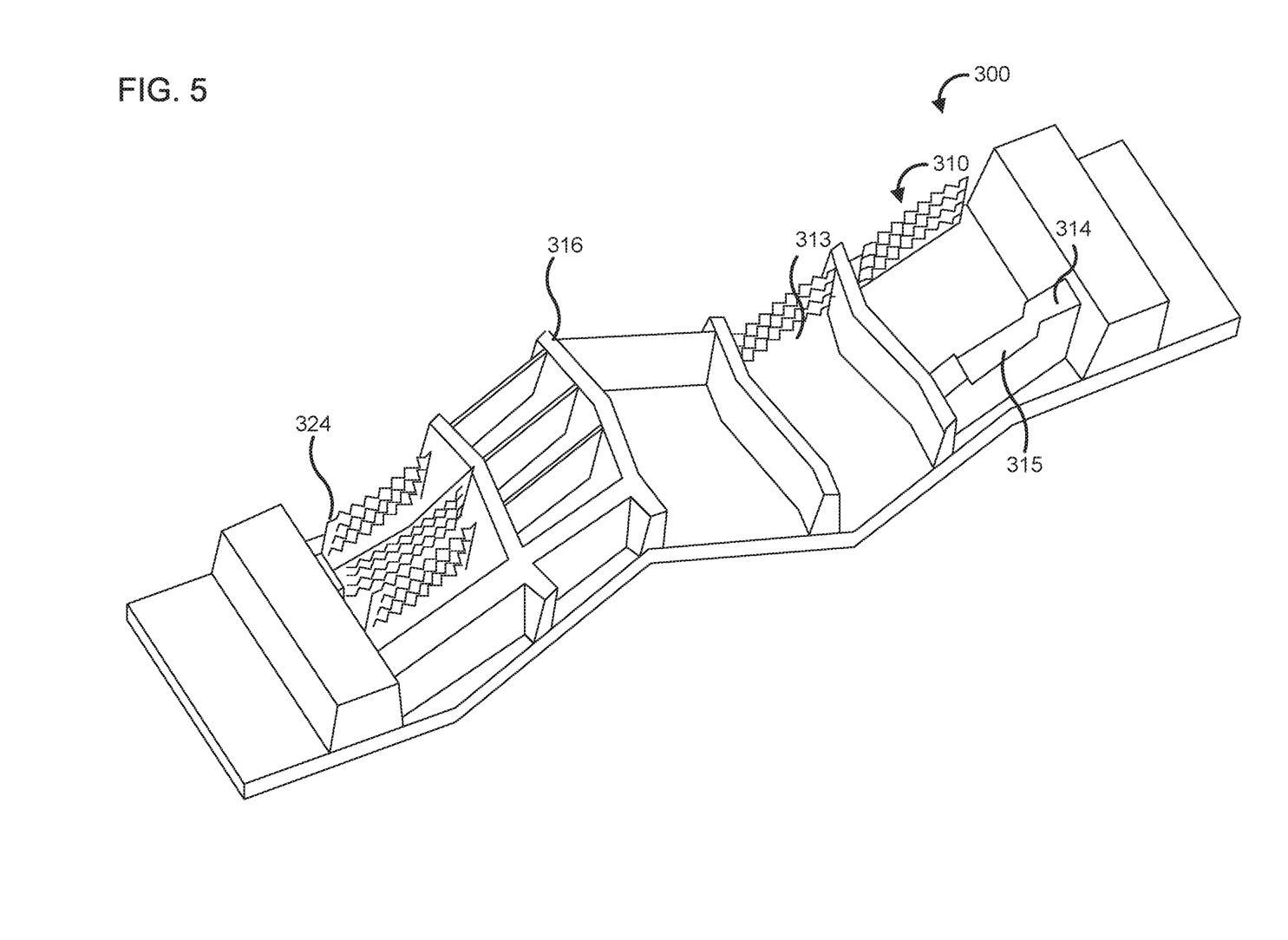
FIG. 5 is a perspective view of a portion of a tire tread mold to form a variable intensity three-dimensional sipe.
Figure 6:
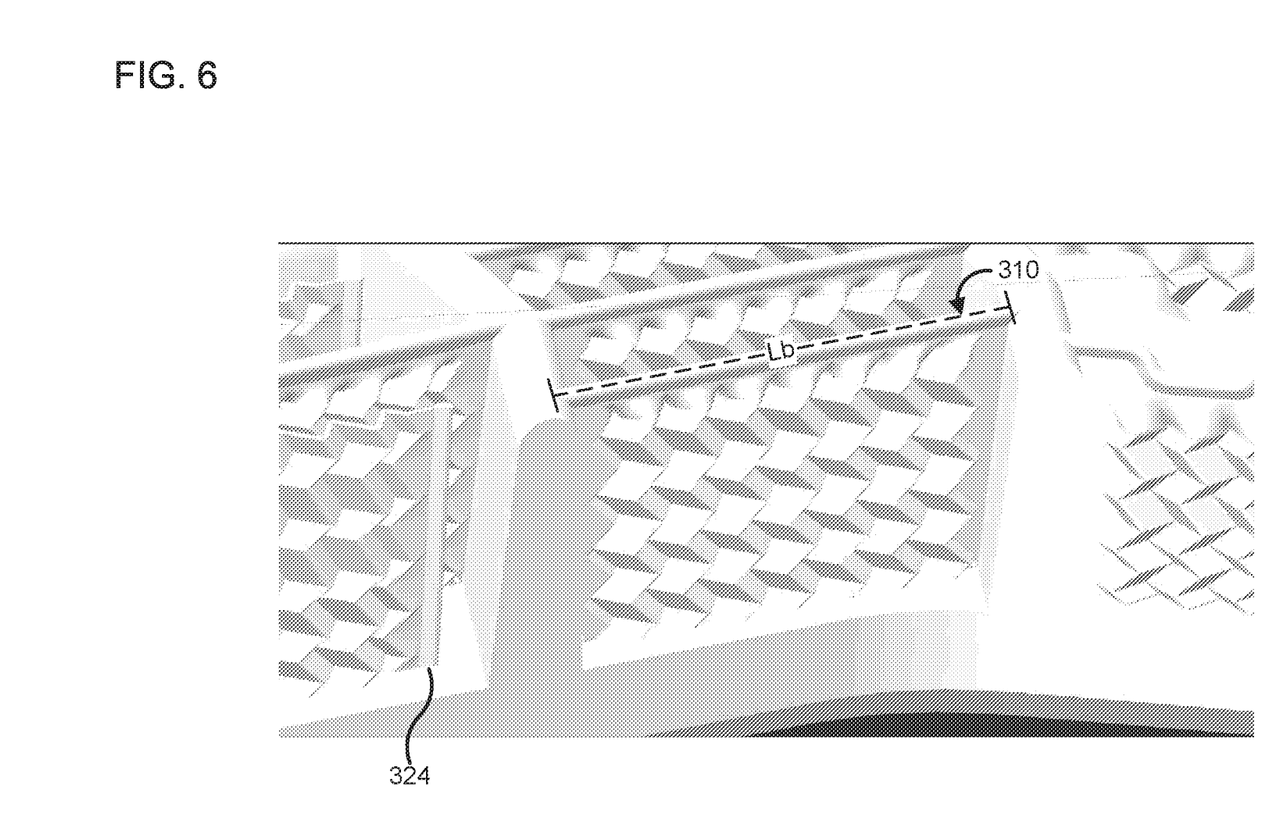
FIG. 6 is a close-up perspective view of a portion of the tire tread of FIG. 1 to form a variable intensity three-dimensional sipe.
Figure 7:
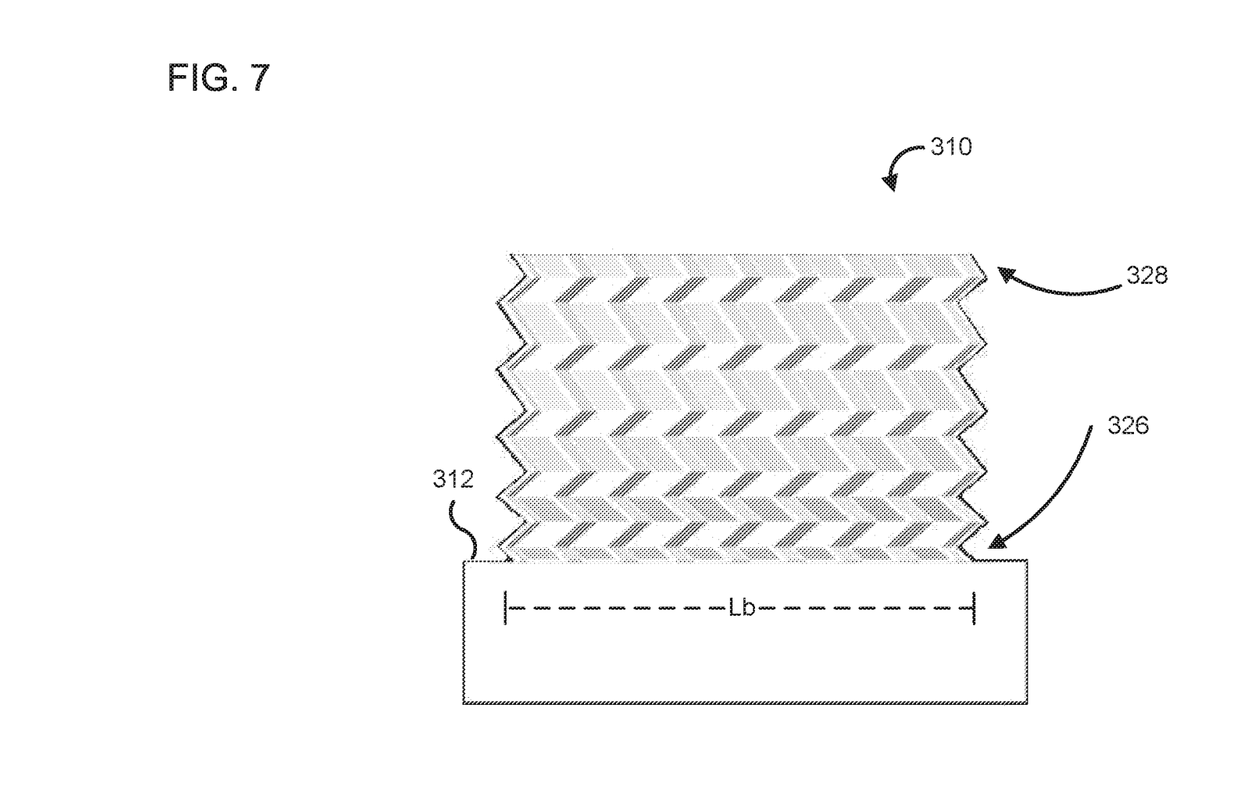
FIG. 7 is an enlarged view of a three-dimensional sipe blade.

FIGS. 5-7 depict an implementation of a tire tread mold 300 having one or more three-dimensional siping blades 310. The mold 300 includes a plurality of lug recesses 313 separated by void forming protrusions 314. A connecting block recess 315 may be formed in the void forming protrusion 314 between each of the lug recesses 313 The depth of each lug recess 313 defines the height "h" of the lugs 113, 213 of the tire treads 100, 200. A depth of each of the connecting block recesses 315 may be smaller than the depth of the lug recesses 313 such that the connecting blocks 115, 215 of the tire tread 100, 200 do not contact the surface on which the tire tread 100, 200 is positioned.

A plurality of groove protrusions 316 may be provided between each of the plurality of tread forming elements 313, 314, 315. The mold 300 can further include tread forming elements for forming shoulder blocks 118, 218 at axial ends of the mold 300 and/or for forming a plurality of notches 119, 219 or slots in the shoulder blocks 118, 218.

It is to be appreciated that while the mold 300 is shown as having a particular tread pattern, the mold 300 may have any other suitable tread pattern. For example, the plurality of tread forming elements 313, 314, 315 may be arranged to include straight, curved or zig zag grooves, a pitch pattern, a non-directional tread pattern, a symmetric tread or an asymmetric tread. Furthermore, the mold 300 may have any suitable combination of tread forming elements 313, 314, 315 to form a tire tread with a corresponding desired aspect ratio or net-to-gross ratio.

The mold 300 may include one or more three-dimensional sipe blades 310. For instance, the one or more three-dimensional sipe blades 310 may be positioned to form a corresponding sipe in a lug, connecting block, and/or void. The one or more three-dimensional sipe blades 310 may be inclined towards a direction of rotation of the resulting tire tread, perpendicular to a direction of rotation of the resulting tire tread, or at any angle from 0 degrees to 90 degrees relative to the direction of rotation of the resulting tire tread. In some implementations, the one or more three-dimensional sipe blades 310 may be set at an angle relative to the circumferential axis $A_C$ of the resulting tire tread.

Each three-dimensional sipe blade 310 may be positioned parallel to an adjacent three-dimensional sipe blade 310 at any suitable pitch or distance therefrom. In some embodiments, the distance may be in a range of 5 mm to 40 mm inclusive of all ranges and values therebetween. Furthermore, the distance or pitch may be fixed or variable.

Furthermore, each of the one or more three-dimensional sipe blades 310 may have a sipe blade height corresponding to the sipe depth d, which can be greater than 50% of the height h of a resulting tread element. For example, each of the one or more three-dimensional sipe blades 310 may have a sipe height corresponding to a sipe depth d in a range of 60% to 100% of the height h of the resulting tread element inclusive of all ranges and values therebetween. In some embodiments, each of the one or more three-dimensional sipe blades 310 may have a sipe height greater than 100% of the height of the resulting tread element (e.g., about 101% to 110% of the height h of the plurality of resulting tread element inclusive of all ranges and values therebetween).

In some implementations, a terminal end 324 can be provided at one or more ends of each three-dimensional sipe blade 310. The terminal end 324 may include a protrusion element (e.g., a cylinder, square, or other three-dimensional geometric element) to facilitate removal of the three-dimensional sipe blade 310 when extracting a cured tire tread from the mold 300. The three-dimensional sipe blades 310 shown include a zig-zag pattern along a blade length LB of the three-dimensional sipe blade 310 and include an alternating saw-toothed type pattern to provide a three-dimensional shape to the resulting sipe in both the blade length LB of the resulting sipe and perpendicular to or at any other angle relative to the blade length LB of the resulting sipe. In other implementations, a sinusoidal pattern, a square pattern, a triangular pattern, or any other pattern may be implemented for the three-dimensional sipe blade 310.

As shown best in FIG. 7, the three-dimensional sipe blade 310 extends upward from a mold base 312 of the mold 300. The three-dimensional pattern of the three-dimensional sipe blade 310 oscillates with a decreasing frequency from a top end 326 of the three-dimensional sipe blade 310 to a bottom end 328 of the three-dimensional sipe blade 310 along the height of the three-dimensional sipe blade 310. That is, a high frequency of oscillation of the three-dimensional pattern is present at the top end 326 and a lower frequency of oscillation of the three-dimensional pattern is present at the bottom end 328. The high oscillation may perform better when the resulting tire tread and the tread element into which the three-dimensional sipe is formed into is tall and near new, while still permitting the three-dimensional sipe mold 300 and three-dimensional sipe blade 310 to be removed from within the molded three-dimensional sipe after curing since the height of the molded tread element may result in more flexibility to be resiliently deformed to extract the three-dimensional sipe blade 310. The high oscillation provides additional support to the tread element from adjacent portions of the tread element even though the tread element is more flexible. The frequency of oscillation decreases as the height of the three-dimensional sipe blade 310 decreases to the bottom end 328. This decreases the amount of lock-up between adjacent tread element portions as the tread wears away. However, each tread element portion becomes stiffer by virtue of the decreasing height of the tire tread, and therefore is less reliant on the adjacent tread element portions for support.

In some implementations, an amplitude of the three-dimensional sipe blade 310 may vary along the height of the three-dimensional sipe blade 310 and/or along the blade length LB of the three-dimensional sipe blade 310. That is, the three-dimensional pattern can have a first amplitude at the top end 326 of the three-dimensional sipe blade 310 and a second amplitude at the bottom end 328 of the three-dimensional sipe blade 310, the first amplitude different from the second amplitude. The first amplitude can be greater than the second amplitude. In still other implementations, the amplitude of the three-dimensional sipe blade 310 may vary at different positions of the three-dimensional sipe blade 310, such as higher amplitudes of the oscillation at the terminal end 324 and/or at the top end 326.

Figure 8:
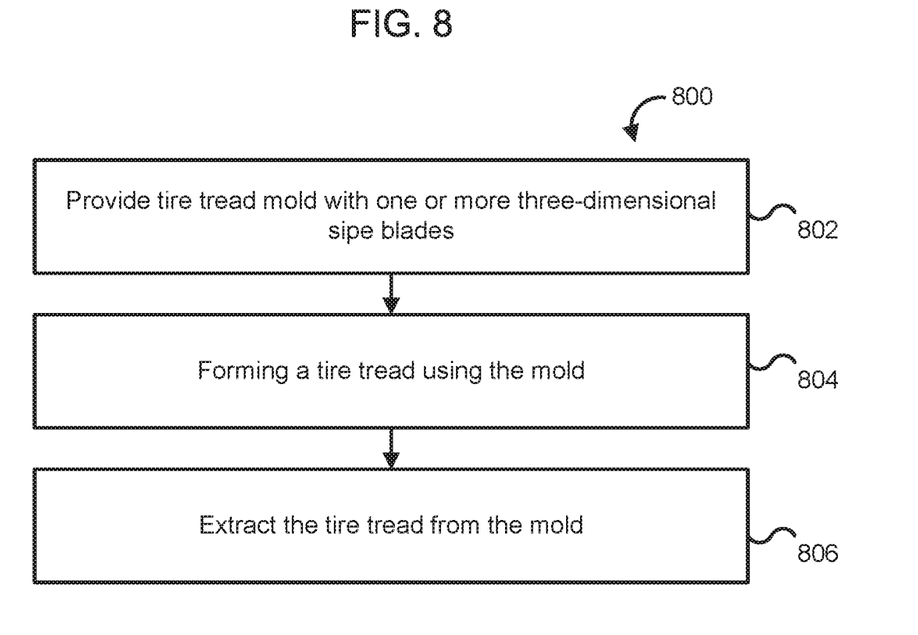
FIG. 8 is a process diagram for forming a three-dimensional sipe in a tire tread using a mold.

FIG. 8 is a schematic flow diagram of an example process 800 for forming a tire tread with varying oscillation three-dimensional sipes. The process 800 includes providing a tire tread mold having one or more three-dimensional sipe blades (block 802) with varying oscillation of the three-dimensional pattern of for the three-dimensional sipe blade, such as mold 300 of FIGS. 5-7. The process 800 may include forming a tire tread using the mold (block 804). In some implementations, a plurality of molds may be positioned adjacent to each other to form an elongated tire tread. In other implementations, the mold may be a single mold for a predetermined length of tire tread to be formed with the three-dimensional sipes therein. The process 800 may also include extracting the tire tread from the mold (block 806). Extracting the tire tread from the mold may be done manually and/or via a tire tread extraction machine. In some implementations, the tire tread can be coupled to or otherwise attached to a tire casing to form a tire. The tire tread and tire casing may be cured together to form a new tire.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

As utilized herein, the term "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled" and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A tire, comprising:
a tire tread with a rotational axis;
a plurality of tread elements positioned on a tire tread surface so as to comprise a tread pattern, the plurality of tread elements positioned at least one of axially or circumferentially on the tire tread surface;
a plurality of grooves provided between the plurality of tread elements; and
a sipe formed by a first wall and a second wall mirroring the first wall in at least one of the plurality of tread elements, wherein, in a depth direction of the sipe, the sipe has a depth that is less than a height of the at least one of the plurality of tread elements, the first wall of the sipe forming a three-dimensional pattern and the second wall forming a mirrored three-dimensional pattern, wherein the three-dimensional pattern comprises one of a saw-tooth pattern, a sinusoidal pattern or a square pattern, that oscillates in the depth direction of the sipe with a decreasing frequency from a first frequency of oscillation at a top end of the sipe to a second frequency of oscillation at a bottom end of the sipe, the first frequency of oscillation being greater than the second frequency of oscillation, the three-dimensional pattern having more than four oscillations between the top end of the sipe and the bottom end of the sipe, and the three-dimensional pattern having a first amplitude at the top end of the sipe and a second amplitude at the bottom end of the sipe, the first amplitude different from the second amplitude.

2. The tire of claim 1, wherein the three-dimensional pattern comprises the saw-tooth pattern, and wherein the saw-tooth pattern provides a three-dimensional shape in both an axial length of the sipe and at an angle perpendicular to the axial length of the sipe.

3. The tire of claim 1, wherein the first amplitude is greater than the second amplitude.

4. The tire of claim 1, wherein, in the depth direction of the sipe, the sipe has a sipe depth of 60% of the height of the at least one of the plurality of tread elements.

5. The tire of claim 1, wherein, in the depth direction of the sipe, the sipe has a sipe depth greater than 50% and less than 100% of the height of the at least one of the plurality of tread elements.

6. The tire of claim 1, wherein the tire is a pneumatic tire.

7. The tire of claim 1, wherein the plurality of tread elements comprise a plurality of lugs provided with a connecting block coupled to a respective pair of lugs of the plurality of lugs, and
wherein the tire further comprises the sipe formed in at least one of the lugs of the plurality of lugs and a second sipe formed in the connecting block.

8. A tread pattern for a tire tread, comprising:
a plurality of tread elements positioned on a tire tread first surface providing the tread pattern, the plurality of tread elements positioned at least one of axially or circumferentially on the tire tread first surface;
a plurality of grooves provided between the plurality of tread elements; and
a sipe formed by a first wall and a second wall mirroring the first wall in at least one of the plurality of tread elements, wherein, in a depth direction of the sipe, the sipe has a depth that is less than a height of the at least one of the plurality of tread elements, the first wall of the sipe forming a three-dimensional pattern and the second wall forming a mirrored three-dimensional pattern, wherein the three-dimensional pattern comprises one of a saw-tooth pattern, a sinusoidal pattern or a square pattern, that oscillates in the depth direction of the sipe with a decreasing frequency from a first frequency of oscillation at a top end of the sipe to a second frequency of oscillation at a bottom end of the sipe, the first frequency of oscillation being greater than the second frequency of oscillation, the three-dimensional pattern having more than four oscillations between the top end of the sipe and the bottom end of the sipe, and the three-dimensional pattern having a first amplitude at the top end of the sipe and a second amplitude at the bottom end of the sipe, the first amplitude different from the second amplitude.

9. The tread pattern of claim 8, wherein the three-dimensional pattern comprises the saw-tooth pattern, and wherein the saw-tooth pattern provides a three-dimensional shape in both an axial length of the sipe and at an angle perpendicular to the axial length of the sipe.

10. The tread pattern of claim 8, wherein the first amplitude is greater than the second amplitude.

11. The tread pattern of claim 8, wherein, in the depth direction of the sipe, the sipe has a sipe depth of 60% of the height of the plurality of tread elements.

12. The tread pattern of claim 8, wherein, in the depth direction of the sipe, the sipe has a sipe depth greater than 50% and less than 100% of the height of the at least one of the plurality of tread elements.

13. A method of forming a tire tread with a varying frequency of oscillation for a three-dimensional sipe, the method comprising:
providing a tire tread mold, the tire tread mold having one or more three-dimensional sipe blades, each of the one or more three-dimensional sipe blades having a three-dimensional pattern, wherein the three-dimensional pattern comprises one of a saw-tooth pattern, a sinusoidal pattern or a square pattern, with a first frequency of oscillation at a top end of the one or more three-dimensional sipe blades and a second frequency of oscillation at a bottom end of the one or more three-dimensional sipe blades, the first frequency of oscillation different from the second frequency of oscillation;
forming the tire tread using the tire tread mold, the tire tread including a sipe formed by a first wall and a second wall mirroring the first wall in at least one tread element wherein, in a depth direction of the sipe, the sipe has a depth that is less than a height of the at least one tread element, the first wall and the second wall of the sipe forming the three-dimensional pattern that oscillates in the depth direction of the sipe with a decreasing frequency from the first frequency of oscillation at a top end of the sipe to the second frequency of oscillation at a bottom end of the sipe, the three-dimensional pattern having more than four oscillations between the top end of the sipe and the bottom end of the sipe, and the three-dimensional pattern having a first amplitude at the top end of the sipe and a second amplitude at the bottom end of the sipe, the first amplitude different from the second amplitude; and
extracting the tire tread from the tire tread mold.

14. The method of claim 13, wherein a shape of the sipe is a sawtooth shape, wherein the sawtooth shape provides a 3-dimensional shape in both an axial length and at an angle perpendicular to the axial length.

15. The method of claim 13, wherein the first amplitude is greater than the second amplitude.

16. The method of claim 13, further comprising:
forming the at least one tread element with a plurality of lugs provided with a connecting block coupled to a respective pair of lugs of the plurality of lugs;
wherein:
the tire tread mold includes a plurality of lug recesses separated by a plurality of protrusions;
each respective protrusion of the plurality of protrusions is provided with a connecting block recess formed in each respective protrusion; and
a depth of the connecting block recess is smaller than a depth of a respective lug recess of the plurality of lug recesses, such that in forming the tire tread, the tire tread is positionable on a surface without the connecting block contacting the surface.

17. The method of claim 13, wherein, in the depth direction of the sipe, the sipe has a sipe depth greater than 50% and less than 100% of the height of the at least one tread element.

18. The method of claim 13, wherein, in the one or more three-dimensional sipe blades, a zig-zag pattern is provided along a blade length of the one or more three-dimensional sipe blades.

* * * * *